United States Patent [19]
Karpen

[11] Patent Number: 5,844,721
[45] Date of Patent: Dec. 1, 1998

[54] MOTOR VEHICLE REARVIEW MIRROR

[76] Inventor: Daniel Nathan Karpen, 3 Harbor Hill Dr., Huntington, N.Y. 11743

[21] Appl. No.: 863,325

[22] Filed: May 27, 1997

Related U.S. Application Data

[63] Continuation-in-part of Ser. No. 599,660, Feb. 9, 1996, abandoned.

[51] Int. Cl.⁶ .......................... G02B 27/00; G02B 23/16; G02B 5/08; G02B 7/182
[52] U.S. Cl. .......................... 359/603; 359/601; 359/884; 359/885; 362/293
[58] Field of Search ...................................... 359/621, 603, 359/884, 885; 362/293; 313/111, 112, 113

[56] References Cited

U.S. PATENT DOCUMENTS

| | | | |
|---|---|---|---|
| 1,601,597 | 9/1926 | Peacock | 359/603 |
| 1,744,316 | 1/1930 | Hodny | 359/603 |
| 4,315,186 | 2/1982 | Hirano et al. | 313/111 |
| 4,482,210 | 11/1984 | Brookman | 359/884 |
| 5,076,674 | 12/1991 | Lynam | 359/603 |
| 5,179,471 | 1/1993 | Caskey et al. | 359/603 |

FOREIGN PATENT DOCUMENTS 762678 of 1956 United Kingdom .

OTHER PUBLICATIONS

David R. Lide, editor, Handbook of Chemistry and Physics; 73rd edition, CRC Press, Ann Arbor, MI 1992 pp. 4–18, 4–77.

Weeks, Mary Elvira; Discovery of the Elements; Journal of Chemical Education; 6th edition; 1960 p. 552, p. 701, pp. 704, 713–714.

Moeller, Therald; The Chemistry of the Lanthanides; Reinhold Publishing Co., New York, NY 1963 pp. 1–4.

Hufner, S. "Optical Spectroscopy at Lanthanides in Crystalline Matrix" in Systematics and the Properties of the Lanthanides; edited by Shyama P. Sinha; 1983; 313, 373.

Weyl, Woldemar A; Coloured Glasses; Dawson's of Pall Mall; London, 1959 pp. 219, 220, 77–78, 221, 226.

Weidert, F. Das Absorptions Spectrum Von Didymglasern bei verschiendenartiger Zusammensetzung des Grundglases; Zeithschritt f. Wissphotog; 1921–22 vol. 21 pp. 254–264.

Weyl, Wolderman A. and Evelyn Chostner Marboe; The Constitution of Glasses vol. 1, Interscience Publishers, a div. of John Wiley, NY, 1962, p. 315.

Bouma, P.J. "The Colour Reproduction of Incandescent Lamps and 'Philiphane Glass'"; Philips Technical Review; 1938, vol. 3, pp. 27–29.

Dannmeyer F., Das Neophanglas als nautisches Hilfsmittel bei unklarer Sicht, Die Glashutte; 1934, No. 4, pp. 49–50. (also including translation of above article).

Gouras, P. and E. Zrenner, "Color Vision", A Review from a Neurophysicalogical Perspective; in progress in Sensory Physiology 1; Springer–Verlag, Berlin–Meidelberg, NY 1981.

(List continued on next page.)

*Primary Examiner*—Cassandra C. Spyrou
*Assistant Examiner*—Mohammad Y. Sikder
*Attorney, Agent, or Firm*—Alfred M. Walker

[57] ABSTRACT

A rearview mirror suitable for use as a rearview mirror for land, water and aircraft and motor vehicles in particular. The glass mirror includes glass containing Neodymium Oxide, a rare earth compound. The Neodymium Oxide filters out the naturally occurring yellow light produced by a hot incandescent filament, thereby producing a color-corrected light. Yellow light contributes to a lack of contrast. Improvement in contrast permits, for example, a motor vehicle driver to better discriminate the contrast of objects when there is no daylight and the only illumination is artificial. For drivers, in particular, elimination of the excessive yellow light lessens eyestrain currently resulting from light emitted by the conventional headlights of vehicles in the rearview mirror during hours of darkness. Additionally, the Neodymium Oxide in the glass will filter out the yellow light from the rising or setting sun in the rearview mirror.

1 Claim, 3 Drawing Sheets

OTHER PUBLICATIONS

Faye, Eleanor "A New Light Source" The New York Association for the Blind, Ny, NY undated, one page.

Neodymlite Report OY Airam AB Finland.

Cohen, Jay M. and Bruce Rosenthal, "An Evaluation of an Incandescent Neodymium Light Source on Near Point Performance of a Low Vision Population", Journal of Visual Rehabilitation, vol. 2, No. 4, 1988, pp. 15–21.

Disclosure Document No. 315,392, Aug. 18, 1992.

Ctyroky, V. Vber mid Nd2 O3 and V2 O3 gefarble Glaser. Glastenchnischen Berichte, Jan. 1940, pp. 1–7.

Rosenhauer, M. Weidert, F., Ueber die spekrale Absorption von Neodymglasern, Glastechnische Berichte, Feb. 1938, pp. 51–57.

MOTOR VEHICLE REARVIEW MIRROR

This application is a continuation-in-part of application Ser. No. 08/599,660, filed Feb. 9, 1996, abandoned.

FIELD OF THE INVENTION

The invention relates to the development of a new motor vehicle rearview mirror, and in particular to a new rearview mirror that will be capable of providing color corrected light that will be capable of improved color rendition and better contrast at the levels of illumination necessary to see while driving at night, and to eliminate much of the discomfort experienced by drivers seeing the headlights of cars in the rearview mirror. As a result, such a rearview mirror can be manufactured without the day/night control presently on rearview mirrors. It can be used on new cars and for older vehicles as a replacement item for the automotive aftermarket.

BACKGROUND AND THEORY OF THE INVENTION

It has long been recognized that visual discomfort from the light from vehicles in the rearview mirror and from the setting or rising sun in the rearview mirror is a major problem that has been unsolved to this time.

One such proposed solution was to install polarizers on automobile headlights. The concepts behind such technology has been summarized by Shurcliff (also see MARKS, British Patent No. 762,678, (1956)). Difficulties involving bulk, fragility, a tendency to become cloudy, polarization defect, and manufacturing costs, prevented the implementation of this technology.

Hirano et al. (U.S. Pat. No. 4,315,186) discloses a reflective lamp with a Neodymium Oxide doped front lens section fused to a reflective mirror section. However, Hirano restricts the amount of Neodymium Oxide in the front lens section to the range of 0.5 to 5.0 percent by weight. At an amount of Neodymium Oxide above 5 percent, the difference in the thermal expansion coefficient between the resultant glass material and that constituting the reflective mirror section and containing no Neodymium Oxide becomes too great, so that it becomes difficult to fuse the front lens section to the reflective mirror section.

Lyman (U.S. Pat. No. 5,075,674) discloses a reduced first surface reflectivity electrochromic/electrochemichromic rearview mirror assembly. In the art of Lynam, Neodymium Oxide is one of a number of possible materials of high refractive index in a triple layer thin film stack. In Lynam, the Neodymium Oxide in the second layer of the triple layer thin film stack has an optical thickness of only one-half wavelength. For visible light at 700 nanometers, the film can only be 350 nanometers thick. This thickness is insufficient for the Neodymium Oxide to absorb much of the yellow light between 565 and 595 nanometers. Lynam discloses the Neodymium Oxide as pure Neodymium Oxide and not a component of glass. In Lynam, the preferred material for the second layer of the triple layer thin film stack is Zirconium Oxide. The function of the triple layer thin film stack is as an anti-reflective coating.

What the present invention does, and what the prior art failed to do, is to incorporate into the glass used in the rearview mirror, Neodymium Oxide in the amount by weight from 5 to 20 percent as a dopant throughout the entire thickness of the glass, which is between 0.5 millimeters and 4.0 millimeters. As described in the specification below, the incorporation of Neodymium Oxide in the glass widens the absorption spectra compared to pure Neodymium Oxide, which has a very narrow absorption band. If the thickness of the glass in the rearview mirror is between 0.5 millimeter and 4 millimeters, then the thickness of the Neodymium Oxide doped glass is 1,428 to 11,428 times thicker than the pure layer of Neodymium Oxide in the Lynam patent.

What the present invention does, and what the prior art fails to do, is to reduce the amount of yellow light in the spectral energy distribution of images in the rearview mirror, since yellow light is the source of most visual discomfort to a vehicle driver.

The approach of the present invention to the problem of visual discomfort from headlights of cars in the rearview mirror is to add Neodymium Oxide, a rare earth oxide, to the glass of the rearview mirror. The light is reflected back to the driver from the mirror after passing through the glass to the silvered back of the mirror with a unique spectral energy distribution, which promotes night vision and visual acuity in darkness, by emphasizing the contrast-producing red and green light waves, and, at the same time, reducing the discomfort producing yellow light waves of the visible light spectrum of the reflected light from headlights of motor vehicles from the rear.

To explain the importance of the present invention, a discussion of its Neodymium Oxide component is as follows:

Neodymium is a rare earth element, having an atomic number of 60 and an atomic weight of 144.24. It combines with oxygen to form Neodymium Oxide, $Nd_2O_3$, having a molecular weight of 336.48.[1]

The elucidation of the rare earths in elemental form took the better part of the nineteenth century, and the properties of Neodymium that are important to the lighting art in this patent application were known even before neodymium was prepared in metallic form. In 1803, Klaproth discovered the mineral ceria. It was also found about the same time by Berzelium and William Hisinger.[2] This mineral proved to be a mixture of various rare earth oxides. In 1814, Hisinger and Berzelius isolated Cerium Oxide from the ceria earth.[3] In 1839, Moslander found the rare earth lanthana in the ceria.[4] In 1841, Moslander treated lanthana with dilute nitric acid, and extracted from it a new rose colored oxide which he called didymium, because as he said, it seemed to be "an inseparable twin brother of lanthanum".[5]

It was believed that didymium was a mixture of elements. The separation proved difficult. In 1882, Professor Bobuslav Brauner at the University of Prague examined some of his didymium fractions with the spectroscope and found a group of absorption bands in the blue region ($\lambda$=449–443 nanometers) and another in the yellow ($\lambda$=590–568 nanometers).[6] In 1885, Welsbach separated didymium into two earths, praseodymia and neodymia.[7] The neodymia has the absorption bands in the yellow region. The neodymia earth is Neodymium Oxide.

The spectra of rare earths became of great interest to a number of investigators. The most impressive feature about the spectra of rare earth ions in ionic crystals is the sharpness of many lines in their absorption and emission spectra. As early as 1908, Becquerel realized that in many cases these lines can be as narrow as those commonly observed in the spectra of free atoms of free molecules.[8]

However, many solids that are of practical use today are amorphous or glassy rather than crystalline. That means that in the immediate environment of like ions in such substances is similar, but that there is no long range order in the sample. Rare earth ions can be easily incorporated into many glasses.

It was noted quite early that in glasses, as might be expected, the most prominent feature of the rare earth crystal spectra, the extreme sharpness of the optical lines, vanishes.

From a simplified point of view, a glass is a supercooled liquid. It can therefore be assumed that the spectra of rare earth ions in glasses will be similar to those of rare earth ions in liquids. The spectra in liquids show a "crystal field splitting", although with very wide lines. This is an indication that the rare earth ions in a liquid are surrounded by a near neighbor shell of ligands—similar to the configuration found in a solid and the same for every rare earth ion, and that the uncorrelated structure is only beyond the near neighbor shell. If the near neighbor coordination in a liquid is the same as in a solid, one can understand the similarity in the magnitude of the crystal field splitting of the crystal and the solution. In glasses the rare earth ions are incorporated as oxides. From the reasoning just cited one can expect that rare earth spectra in glasses to be similar to those of the stable oxide modification of the particular rare earth ion; this expectation is verified by experimental findings.[9]

The absorption of an ion may undergo a fundamental change when placed in different surroundings. A great variety of colors which can be obtained with divalent copper, cobalt, or nickel ions have been attributed to the differences in co-ordination numbers and the nature of the surrounding atomic groups. The change of an ionic bond into a covalent bond produces a completely different absorption spectra. The close interdependence of light absorption and chemical change is not surprising when it is realized that the electrons which are responsible for the visible absorption are also responsible for the chemical interactions and the formation of compounds.

The case, however, is different with the rare-earth compounds. Their colors depend on the transitions taking place in an inner, well protected, electronic shell, whereas the chemical forces, as in other elements, are restricted to deformations and exchanges of electrons within the outer electronic shells. Consequently, the color of Neodymium compounds remains practically independent of the nature of the atoms in which the element is linked. The hydrated salts are amethyst colored, just as the water free salts, the ammoniates, the hydroxide, or the oxide. Chemical changes affect color only to a minor extent.[10]

A number of studies of Neodymium Oxide containing glasses have been conducted to examine the absorption spectra. Weidert conducted a systematic study in 1922. Samples of pure Neodymium Oxide glasses were made available for the first time, relatively free of contamination from impurities such as praeseodymium.[11] Spectra were published showing the absorption of yellow light in a broad band from 568 to 590 nanometers.[12].

According to Rosenhauer and Weidert, the absorption spectra of the $Nd^{+3}$ ion in glasses signals any change of the structure which affects the stability of the glassy state. Composition changes which increase the tendency of a glass to devitrify also blur the normally sharp absorption bands of the $Nd^{+3}$ ions. The absorption indicators can be used therefore for studying the compatibility of oxide systems.[13] In their studies, the base glasses differed in their alkalis. The smaller the atomic radius of the alkali the more diffuse is the absorption band. The fine structure of the rubidium glass gradually disappears when this large alkali is replaced by the smaller potassium, sodium, or lithium ion. The corresponding lithium glass could be obtained only by rapid cooling; otherwise crystallization took place. Thus, there seems to be a general connection between the tendency of a glass to devitrify and its absorption spectrum. In all the glasses which crystallize readily Neodymium causes only a somewhat diffuse absorption spectrum.[14] Regardless of the alkali base of the underlying glass, the absorption of yellow light between 568 and 590 nanometers is seen in all samples of glass (see FIG. 1).[15]

Glasses containing Neodymium Oxide experience "dichroism". In artificial light, the Neodymium Oxide glass appears as a brilliant red. The color sensation not only varies with the type of illumination, but also with the thickness of the glass layer. In thin layers or with low concentrations of Neodymium Oxide these glasses are blue, in thick layers or with high concentrations, red.[16]

V. Ctyroky made a study of the dichroism of glasses containing various combinations of Neodymium and Vanadium. It was his attempt to calculate the thickness of the glass and the concentration of the colorants which produce the maximum dichroism. The color play of these glasses is caused by the Neodymium Oxide, for the Vanadium Oxide produces a green color which serves only to modify the original blue-red dichroism of the rare earth. The absorption of the yellow light between 568 and 590 nanometers is so intense that even a faintly colored Neodymium Oxide glass absorbs yellow light almost completely. Thus the transmitted spectrum is divided into two parts, a blue and a red one. The color sensation which such a glass produces depends on the intensity distribution of the light source. In daylight the blue part predominates; in artificial light (incandescent), which is relatively poor in short-wave radiation, the red predominates.[17]

The characteristic absorption of a Neodymium Oxide glass, especially its narrow intense band in the yellow part of the spectrum, affects color vision in a unique way. Looking through such a glass at a landscape or a garden in bloom, the red and green hues are strongly accentuated; especially do all colors containing red stand out very clearly.[18] This improvement is very important at the low levels of illumination provided in a rearview mirror, particularly at night.

Another interesting feature when looking through a Neodymium Oxide glass is the distinction between the green of vegetation and a similar green hue produced by the blending of inorganic pigments. Whereas the hues of both greens may be the same, the reflection spectra are fundamentally different in respect of their intensity distribution; for the chlorophyll of plants possesses a spectrum rich in fine structure.[19] Such an effect is very important for vision along highways.

Bouma explains how the electric light (incandescent lamp) can be improved by the introduction of a colored envelope using a glass with Neodymium Oxide, known as "Neophane" glass (for purposes of clarity, an envelope refers to the outer shell of a lamp bulb). It is clear that large portions of the spectrum must not be weakened to any extent. Otherwise, there would be too great a decrease in the efficiency. Only an improvement of the color which can be obtained with a relatively slight loss of light can be considered.[20]

The only possibility thus consists of the absorption of one or more relatively small regions of the spectrum. The pertinent question is what colors may be considered in this connection? In general, absorption of a given color is accompanied by the following two objections:

1. An object which reflects almost exclusively this color appears too dark.
2. Objects which exhibit the color under consideration in a less saturated form will appear still less saturated.

The first objection holds primarily for the colors at the extremities of the spectrum, thus for red and blue. Very saturated red, for example, can only occur when a material reflects practically exclusively red and orange. The same is true of blue.

For yellow, the situation is different. Highly saturated yellow occurs in nature as a rule, not only because a narrow region of the spectrum is reflected, but because red and green as well as yellow are fairly well reflected, and only blue and violet are absorbed to a large extent.

The second objection also holds particularly at the extremities of the spectrum: the blue, which is reproduced in electric light is a much less saturated form than in daylight, may certainly not be made still duller. The saturation of the red may also not be decreased too much, since otherwise the reproduction of skin color would be made worse.

For the reasons mentioned above, the second objection is also of much less importance in the case of yellow.

Bouma surrounded an incandescent lamp with a bulb of the Neodymium Oxide containing Neophane glass, and compared the color rendition to an incandescent lamp surrounded by an ordinary opal glass bulb. His results indicated the majority of the colors became more saturated, a change which is to be desired, especially at relatively low levels of illumination. In particular, the blue, which upon changing from daylight to incandescent has become considerably less saturated is again reproduced in a more saturated form.

The orange is shifted toward the red: the shift in the direction yellow to red is in general experienced as an increased "warmth" of that color.

The green, which upon translation from daylight to incandescent light had become a somewhat dubious yellow-green, goes back to green again under the influence of the Neophane glass.

Finally, Bouma notes that white and the very unsaturated colors are shifted in the direction of blue-violet. This may certainly not be considered an advantage since however the change is not very great (less than ⅓ of the difference between incandescent light and daylight), and moreover since it lies almost in the same direction as the shift on transition from daylight to incandescent light, the shift is not disturbing.[21]

In summary, Bouma found that the use of the Neodymium Oxide containing Neophane glass has the advantage of reproducing most colors in a more saturated form and of making the orange-yellow warmer. Various disadvantages of incandescent light, such as the faded appearance of blue and the shift of green towards yellow-green, are partially overcome. The most important advantages of the incandescent light such as the high saturation of the orange and of the colors in its neighborhood, the greater intensity of red, are retained.

Dannmeyer made an investigation of Neodymium Oxide containing Neophane glass as a vision aide in bad weather for navigational purposes.[22] His experiences parallel those of a motorist on a foggy or rainy night. If one looks at a spectrum through this glass, one will notice that yellow is eliminated, but red and green appear much clearer. If one looks at a landscape, even in murky weather, one will see wonderful lustrous colors, emphasizing everything red and even green. But there is another special effect: the discomforting blinding effect created principally by yellow disappears at the same time. If one looks at the branches of a bare tree against a bright sky, one won't be able to see the ends. They disappear in the general glaze. If, however, one looks through the Neodymium Oxide glass—or as it is now technically called, Neophane glass—even the slightest differences are emphasized. All blinding effects against the clear sky or the sun, disappear and the elements of the optical picture appear more sharply even when looking toward the sunset and twilight pictures have more contrast.

As further noted in Dannmeyer,[23] the effects of using the Neodymium Oxide containing Neophane glass was studied during the summer and fall on the Elbe River and in the North and Baltic Seas. It was shown that clear sighting made red and green as already mentioned, especially clear. External identification of a ship by the color of its smoke stack, bottom paint, ensign and other elements was made much easier. If the weather was hazy or misty, so that one could see the other ship only as a silhouette grey against grey, color differences could still be seen that could not have been recognized with unaided sight. But what was immensely important was that ships that in hazy weather seemed to be the same distance apart, were seen to be at varied distances from one another; both location and movement were much easier to differentiate.

In addition, it is well known that on the Elbe, at sunset, outgoing ships looking into the sunset have on occasion had optical difficulties caused by the blinding of the sun. Markers are difficult to distinguish, and even though ship pilots are exceedingly well informed, discerning an oncoming ship is sometimes exceedingly difficult.

According to Dannmeyer, Neodymium Oxide containing Neophane glass prevents all of these things from happening to the eye. Along the lower Elbe one is able to distinguish a lengthening of the coastline even in hazy weather, and thus seeing distances are actually extended by about a nautical mile. On the North Sea, it is possible to make out various vessels that would not have been discernible in the misty weather. The grey of the vessels appears darker than the surroundings through the eyeglasses. In the direction of the sinking sun, in which the eye really could not distinguish objects, the vessels were clearly discernible through the Neodymium Oxide containing Neophane glass.[23]

The aforementioned studies of Neodymium Oxide containing glass in window and indoor light bulb applications can be applied to the previously undiscovered use of the present invention for rearview mirrors, for better vision during night driving, as well as eliminating the discomfort from a rising or setting sun.

According to the present invention, when the Neodymium Oxide glass is used in a rearview mirror for night and bad weather driving, the discomforting undesirable yellow light is filtered out, making objects more clear with improved contrast and color rendition. In addition, the eyestrain caused by the intense yellow of the point sources of oncoming individual headlights coming from the rear in the rearview mirror is eliminated, ending once and for all the discomfort experienced from light from headlights from cars from the rear.

It is possible to manufacture a rearview mirror without the day/night control which is presently part of a rearview mirror.

A physiological explanation of how the eye sees colors provides an explanation of the visual effectiveness of Neodymium Oxide glass for rearview mirrors. The following explanation is provided by Gouras:[24]

There are three cone mechanisms in the human visual system, with peak sensitivities near 440 nanometers in the blue-violet, 540 nanometers in the green, and 610 nanometers in the orange. These mechanisms are loosely called "blue", "green" and "red" processes in vision because they may be roughly thought of as being affected, respectively, by blue, green, and red light.

There are approximately 6 to 7 million green plus red cones per eye, and less than 1 million blue cones. The green and red cones contribute towards seeing fine detail and contrasts; the blue cones do not. The blue cones are thought to provide, mainly, the means of distinguishing between yellow and white appearing objects; the blue-cone mechanism is excited by blue light and inhibited by yellow light.

When mid-spectral (yellowish) images are in sharp focus on the retina, bluish wavelengths are out of focus. Low visual acuity is associated with the blue-cone mechanism, and high visual acuity with the green plus red cone mechanism. The term "yellowish images" does not necessarily imply any yellow content in the light, since green plus red yields the sensation of yellow.

The cones feed their signals into various kinds of cells in and beyond the retina. Strongly cone opponent cells are those cells that are excited by one color of light and inhibited by another. The "red-green contrast detectors" contribute heavily to both luminance and color contract, and also to the detection of differences between elements of a scene. They supply information on fine spatial detail.

The strongly cone-opponent cells (associated with the green and red cones) are turned off or on by green or red light, and are very unresponsive to yellow light. The red-green contrast detector is totally inhibited by yellow light.[25]

Thus, a rearview mirror with Neodymium Oxide containing glass appears to provide the maximal filtering effect of the discomforting yellow light in order to improve contrast, visual acuity and color recognition.

Two recent studies of the functioning of the eye for people of low vision are of interest. Neodymium Oxide type motor vehicle rear view mirrors will be of help not only to people who have normal vision, but also to people who may be visually impaired.

Faye reports that the visual impression in viewing colored objects is a vivid "true" color similar to the view in full sunlight.[26] In viewing high contrast acuity charts, contrast sensitivity chart tests (Vistech VCTS 6500), and reading material, there is an increased contrast between black and white, when incandescent light bulbs containing Neodymium Oxide are used indoors. White appears whiter and black blacker because of the decreased yellow emission of the Neodymium Oxide containing bulb.

To date, while no specific recommendations can be made, it appears that a history from visual impaired patients that they need sunlight for best reading (or can't read by artificial light), indicates a favorable response to the Neodymium Oxide containing light bulbs. Favorable responses have been elicited from patients with retinitis pigmentosa, optic atrophy, glaucoma with visual field defects, and diabetes with proliferative retinopathy who have undergone panretinal photocoagulation.

A study of low vision patients was conducted by Cohen and Rosenthal at the State University of New York School of Optometry in New York City.[27] Their study also found more accurate color rendering and an improvement in visual acuity, contrast, and a reduction of eye fatigue. Tests were conducted on 51 low vision patients using standard incandescent lamps and standard "A" type Neodymium Oxide lamps on the Vistech 6000 Contrast Test and high and low contrast acuity cards. Results showed a small, but statistically significant performance on all targets when using Neodymium Oxide bulbs. Subjective preference also favored the Neodymium Oxide bulbs in a 5 to 1 ratio when a preference was present. The patient population had such pathologies such as achromotopsia, albinism, cataracts, congenital cataracts with aphakia, cortical anoxia, diabetic retinopathy, optic atrophy, pathological myopia, primary nystagmus, retinitis pigmentosa, ROP, and SMD.

As a result, it is shown that the use of Neodymium Oxide containing incandescent light bulbs filter out unwanted excessive yellow light, thus favoring vision promoting red-green contrast detectors, to improve visual contrast, visual acuity and better color recognition. The same effects would be present for images in a rearview mirror with a Neodymium Oxide containing glass.

REFERENCES

1. David R. Lide, editor; *Handbook of Chemistry and Physics;* 73rd edition; CRC Press; Ann Arbor, Mich.; 1992. p. 4-18, 4-77.

2. Weeks, Mary Elvira; *Discovery of the Elements;* Journal of Chemical Education; 6th Edition; 1960; p. 552.

3. Moeller, Therald; *The Chemistry of the Lanthanides;* Reinhold Publishing Company; New York, N.Y.; 1963; pp. 1–4.

4. Weeks; p. 701.

5. Ibid., p. 704.

6. Ibid., p. 713.

7. Ibid., p. 714.

8. Hufner, S.; "Optical Spectroscopy of Lanthanides in Crystalline Matrix"; in *Systematics and the Properties of the Lanthanides;* edited by Shyama P. Sinha; 1983; p. 313.

9. Ibid., p. 372.

10. Weyl, Woldemar A.; *Coloured Glasses;* Dawson's of Pall Mall; London; 1959; p. 220.

11. Ibid., p. 219.

12. Weidert, F.; "Das Absorptionsspektrum von Didymglasern bei verschiendenartiger Zusammensetzung des Grundglases"; Zeithschrift f. wiss. Photog.; 1921–22; Vol. 21; pp. 254–264.

13. Weyl, Woldemar A., and Evelyn Chostner Marboe; *The Constitution of Glasses,* Vol. 1; Interscience Publishers, a division of John Wiley & Sons; New York, N.Y.; 1962; p. 315.

14. Weyl, Coloured Glasses, p. 77.

15. Ibid., P. 78.

16. Ibid., P. 221.

17. Ibid., P. 221–222.

18. Ibid., P. 226

19. Ibid.

20. Bouma, P. J.; The Colour Reproduction of Incandescent Lamps and "Philiphane Glass"; Philips Technical Review; 1938; Vol. 3; pp. 27–29.

21. Ibid.

22. Dannmeyer, F.; "Das Neophanglas als nautisches Hilfsmittel bei unklarer Sicht"; Die Glashutte; 1934; Number 4; pp. 49–50.

23. Ibid.

24. Gouras, P. and E. Zrenner; "Color Vision: A Review from a Neurophysiological Perspective"; in *Progress in Sensory Physiology* 1; Springer-Verlag, Berlin-Heidelberg-New York, 1981.

25. Ibid.

26. Faye, Eleanor; "A New Light Source"; The New York Association for the Blind; New York, N.Y.; undated; one page.

27. Cohen, Jay M. and Bruce P. Rosenthal; "An Evaluation of an Incandescent Neodymium Light Source on Near Point Performance of a Low Light Vision Population"; Journal of Visual Rehabilitation; Vol. 2, No. 4; 1988; pp. 15–21.

SUMMARY OF THE INVENTION

The present invention relate to rearview mirrors for land and water vehicles. A vast improvement in visual performance, color rendition, and contrast of objects is achieved by, for instance, a rearview mirror containing Neodymium Oxide in the glass of the glass mirror.

The rearview mirror, as an example of the present invention, has a glass mirror which may be made of soda lime glass.

The transmittance of light through glass is governed by the Lambert-Beers Law, which relates the amount of light transmitted through a certain thickness of glass by an absorption coefficient:

$$Ln(T) = -AL$$

In the above equation, L is the thickness of the glass, A is the absorption coefficient, T is the percentage of light transmitted, and Ln represent the natural logarithm.

For the purposes of manufacturing Neodymium Oxide containing glasses, the Neodymium Oxide must be reasonably pure. Impurities can reduce transmittance of wavelengths other than the yellow, which is absorbed by the Neodymium Oxide.

The use of Neodymium Oxide as an ingredient in glass making, especially for the production of millions, if not tens of millions of rearview mirrors annually, requires a substantial amount of Neodymium Oxide of purity of 98 percent. The absorption properties of Neodymium Oxide containing glasses were know prior to World War II. However, the cost of producing reasonably pure Neodymium Oxide was quite high, because the chemical properties of the lanthanides are similar, and separation is difficult.

During World War II, while working on the separation of the fission products as part of the atomic bomb project, scientists developed the elution chromagraphic ion exchange method for separating the rare earth elements. A major breakthrough occurred in the 1950's when Frank H. Spedding and co-workers developed the band-displacement ion exchange method, which was capable of producing macro quantities of extremely pure individual elements. Within 10 years, liquid—liquid extraction methods were developed which provided even lower priced individual rare earth elements.

Thus, it is possible to manufacture Neodymium Oxide containing rearview mirrors at a reasonable cost, that does not add significantly to the price of a new air, water or landcraft, or in particular an automobile, and the rearview mirrors can be reasonably priced to compete in the vehicle aftermarket.

Neodymium Oxide containing glasses are commercially available for use in glass mirrors. One example of a glass that is available that may be used for the purposes of the rearview mirror of the present invention is described below. One glass, a mixed alkali zinc silicate crown glass that can be used for a rearview mirror, L6660, is manufactured by Schott Glass Technologies of Duryea, Pa. 18642. It has 4.0 percent Neodymium Oxide doping with an extinction coefficient of 8.1 $cm^{-1}$ at 585 nanometers. Superb effects can be obtained with a glass such as S-8801, also manufactured by Schott Glass Technologies. This glass in a thickness of 3.39 millimeters, can filter out between 95% and 98% of the light between 565 and 595 nanometers. In a rearview mirror, the glass would be 1.695 millimeters thick, since any light reflected from the mirror makes a path from the front surface of the mirror to the silver reflecting surface at the back of the mirror, gets reflected, and returns to the front surface of the mirror before passing from the front surface so it can be seen by an observer.

DESCRIPTION OF THE DRAWINGS

The invention can best be understood with reference to the following drawings in which.

DETAILED DESCRIPTION OF THE DRAWINGS

Figure 1:
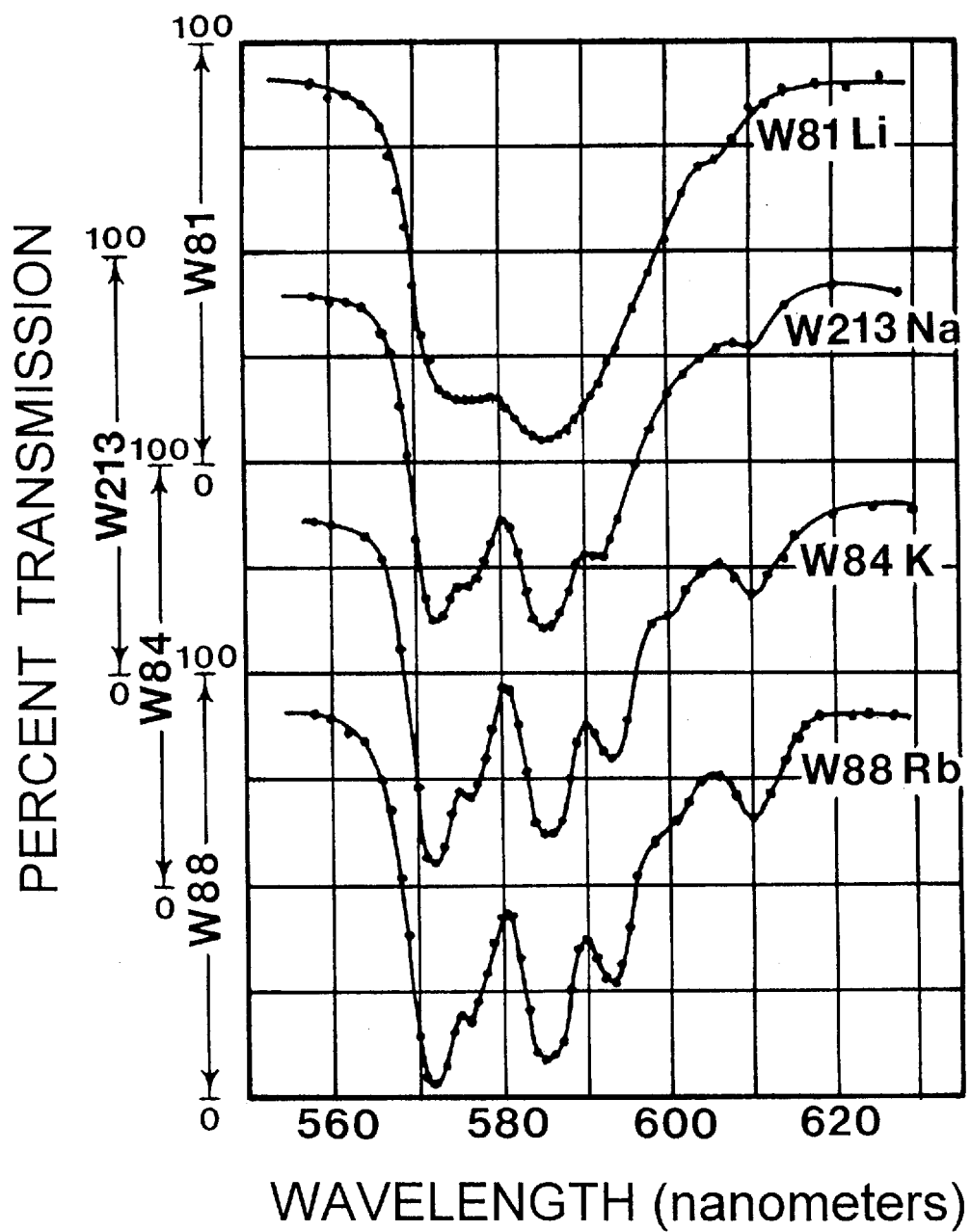
FIG. 1 is a graph comparing the transmittance of a number of Neodymium Oxide containing glasses.

FIG. 1 shows the transmission of various glasses containing Neodymium Oxide. It is shown that the smaller the atomic radium of the alkali the more diffuse is the absorption band. The fine structure of the rubidium glass gradually disappears when this large alkali is replaced by the smaller potassium, sodium, or lithium ion. The importance for the invention at hand of this graph is that regardless of the base type of the glass, the absorption of yellow light between 568 and 590 nanometers is seen in all samples of glass. It is seen that the W87 lithium base Neodymium Oxide glass is absorbing 95% of the yellow light at 585 nanometers.

Figure 2:
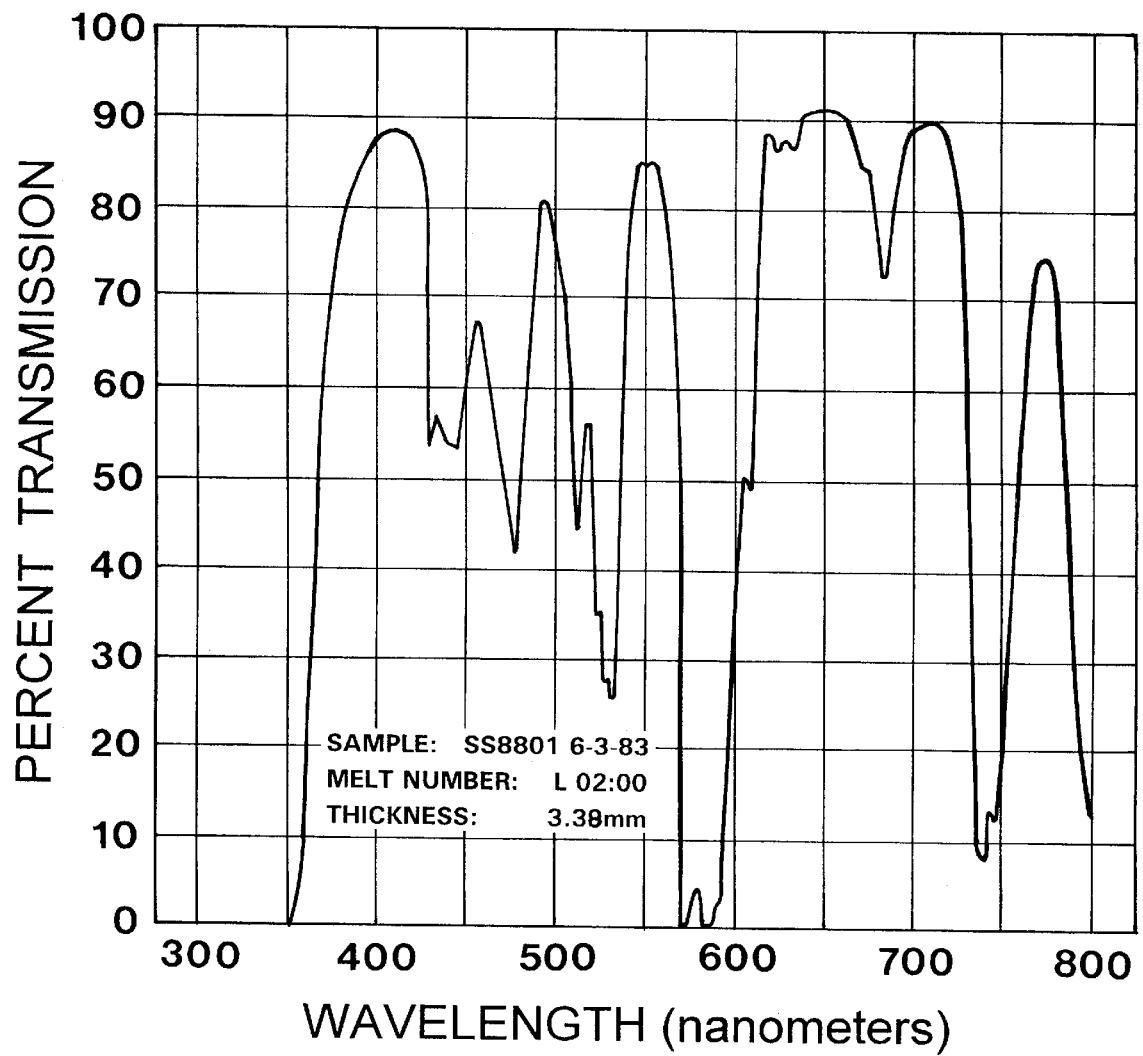
FIG. 2 is a graph showing the transmittance of a Neodymium Oxide containing glass, S-8801, as manufactured by Schott Glass Technology.

FIG. 2 shows the transmittance of a Neodymium Oxide containing glass, S-8801, when used to filter light. It is seen that a notch is shown in the transmission of light between 565 and 595 nanometers. Each bar in the graph is 5 nanometers wide. At the trough of the notch, the Neodymium Oxide is filtering out between 95 and 98 percent of the yellow light.

Figure 3:
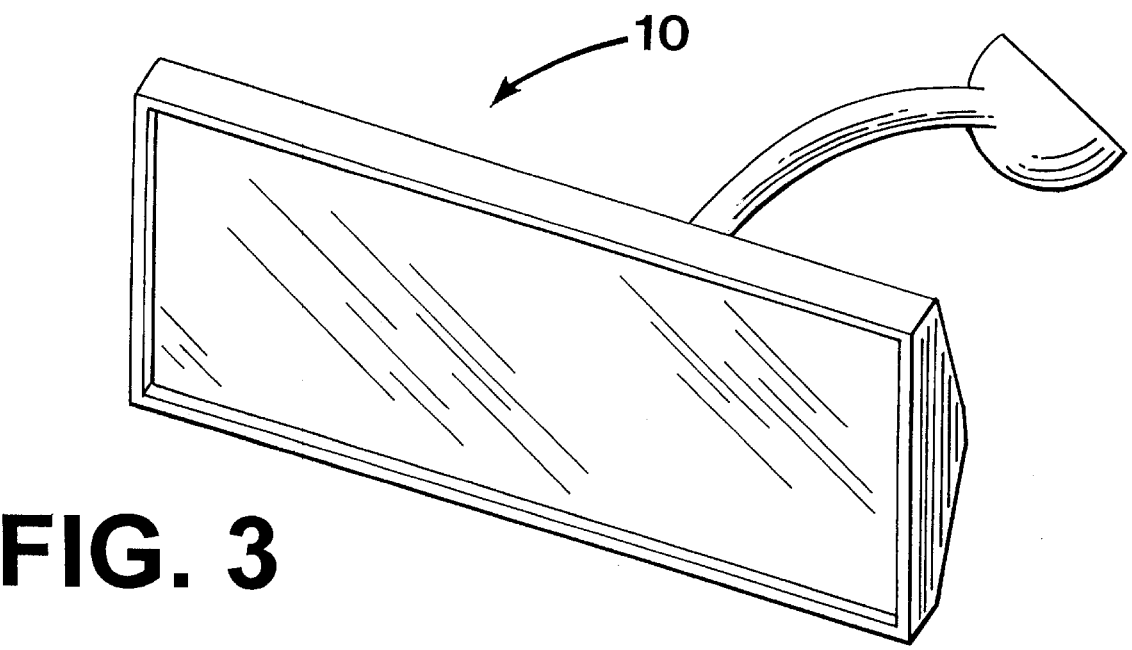
FIG. 3 is a perspective view of a rearview mirror of the present invention.
Figure 4:
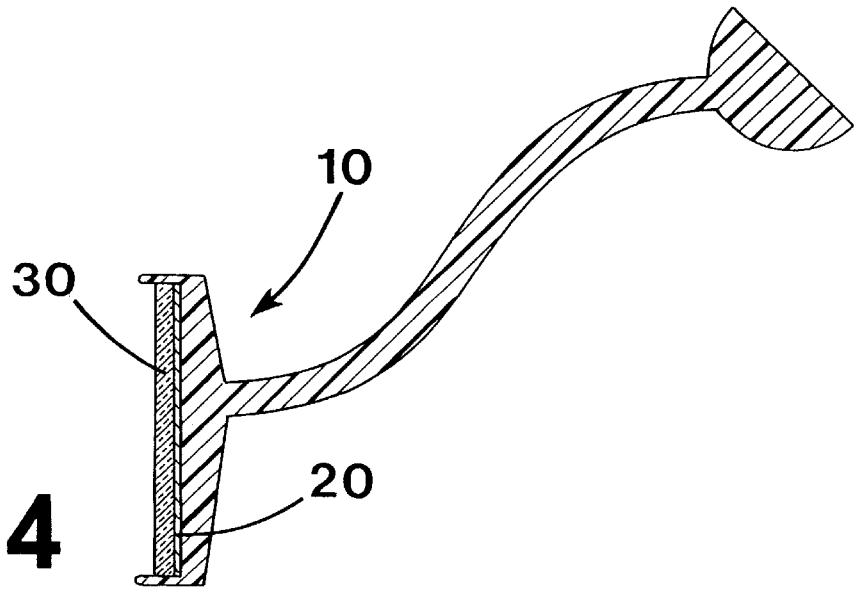
FIG. 4 is a side sectional view of the rearview mirror as in FIG. 3.

FIGS. 3 and 4 show a typical rearview mirror 10 having a back silvered reflective surface 20 and a front glass pane 30 containing Neodymium Oxide therein, in front of the silvered reflective surface 20. Light from the rear is transmitted through the front glass pane 30 to the silvered reflective surface 20, after which it is reflected back to the driver of an automobile having rearview mirror 10.

DETAILED DESCRIPTION OF THE PREFERRED EMBODIMENT

The present invention constitutes a motor vehicle rearview mirror 10, including a means for reflecting light and has an glass mirror of a suitable glass material, containing the element Neodymium, wherein the Neodymium compound is Neodymium Oxide. The glass mirror includes a back reflective silvered surface 20 and a transparent glass pane 30 in front of the silvered reflection surface 20.

The light is reflected back to the driver with a unique spectral energy distribution, which promotes night vision and visual acuity in darkness, by emphasizing the contrast-producing red and green light waves, and at the same time, reducing the discomfort producing yellow light waves of the visible light spectrum of the concentrated light beam from headlights of motor vehicles in the rearview mirror 10.

The glass 30 of the rearview mirror 10 includes the element Neodymium, in the form of Neodymium Oxide, in an effective amount for reducing discomfort from yellow light in a concentration of 5% to a concentration of about 30% within the glass 30. In the preferred embodiment for the Neodymium Oxide, it may also be selected in a concentration from about 5% to a concentration of about 20% in the glass of the glass mirror of the rearview mirror.

The Neodymium Oxide is employed in the rearview mirror 10 for a vehicle, such as an automobile, an aircraft, a water craft and other land traversing vehicles, such as all terrain vehicles or motorcycles.

In use, the glass 30 of the rearview mirror 10 of the present invention has a spectral energy distribution signature bearing a reduction in yellow light, which is characterized as spectral energy in the wavelengths of light from about 565 nanometers to about 595 nanometers.

Preferably, the rearview mirror 10 constitutes a spectral energy distribution signature having a substantial reduction of up to between 95 and 98% of the yellow light, namely light with reflected spectral energy for wavelength from about 565 to about 595 nanometers as compared to reflected spectral energy of a clear glass mirror not containing Neodymium Oxide.

The rearview mirror 10 of the present invention is used to improve vision under conditions of artificial illumination, for providing artificial illumination in a spectral energy distribution signature having a reduction of up to between 95 to 98% of yellow light, namely light with transmitted spectral energy for wavelengths from about 565 to about 595 nanometers, as compared to reflected spectral energy of a clear glass mirror not containing Neodymium Oxide.

The present invention specifically includes the use of a rearview mirror for a vehicle and it has a glass mirror of a suitable material, such as a compound including the element Neodymium, wherein the Neodymium compound is Neodymium Oxide.

Specifically, to improve highway traffic safety at night in the absence of daylight and during periods when the rising or setting sun is in the rearview mirror 10, the rearview mirror 10 improves vision by providing a rearview mirror, including glass 30 having Neodymium Oxide, in a spectral energy distribution signature having a reduction of yellow light, such as light with up to 95 to 98% of reflected spectral energy for wavelengths from about 565 to about 595 nanometers, as compared to reflected spectral energy of a clear glass mirror not containing Neodymium Oxide.

Modifications can be made to the method used for making the device, the device itself as well as the process described for the rearview mirror without departing from the spirit and scope of the invention as exemplified in the appended claims.

I claim:

1. A rearview mirror for motor vehicles, which reduces visual discomfort and eyestrain, and improves color recognition, by reducing the amount of reflected yellow light in the range of 565 to 595 manometers, consisting of:

a pane of glass having a back surface and a front surface;

a silvered reflective surface on said back surface of said pane of glass; and said pane of glass consisting of glass having the compound Neodymium Oxide throughout in a concentration by weight from greater than 5% to about 20%; said pane of glass being 0.5 to 4.0 millimeter thickness to have transmission properties absorbing up to 95% to 98% of the reflected spectral energy of light of the wavelengths between 565 and 595 manometers as light is being transmitted from said front surface of the said pane of glass to the said silvered reflective surface on the back of said pane of glass, reflected and being transmitted back to the front of the glass surface of said pane of glass and back to the eye where it can be seen.

* * * * *